J. S. CAIN.
HARVESTER FOR BEANS AND THE LIKE.
APPLICATION FILED AUG. 10, 1911.
1,093,108.
Patented Apr. 14, 1914.
3 SHEETS—SHEET 3.
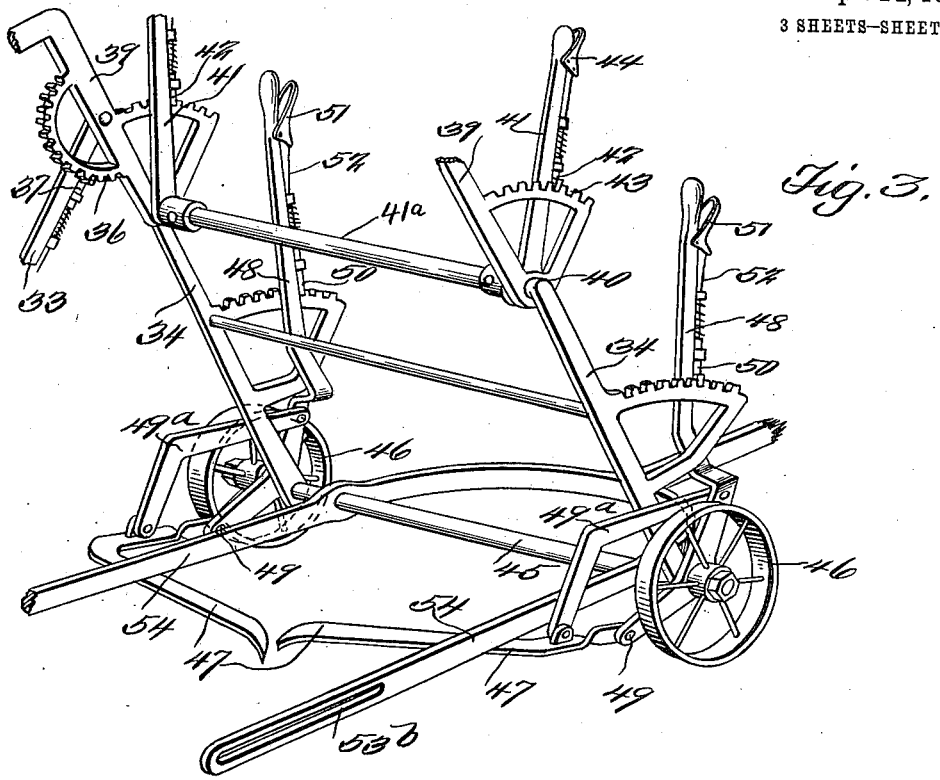
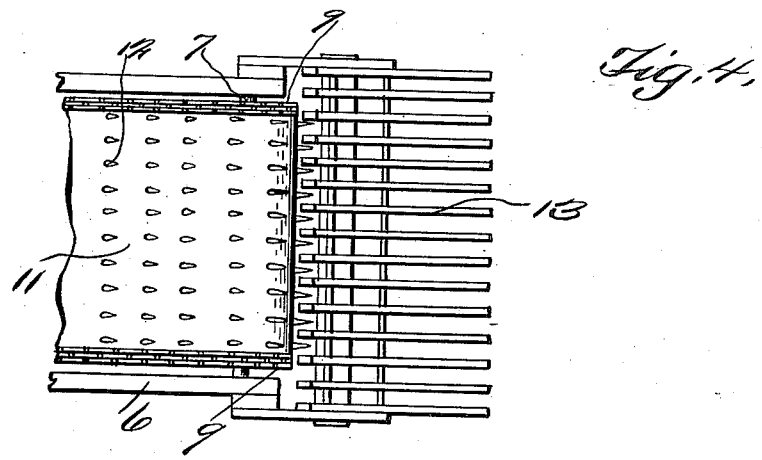
Witnesses
Francis G. Boswell
C. E. Frothingham
Inventor
Jesse S. Cain,
By D. Swift & Co.
Attorney

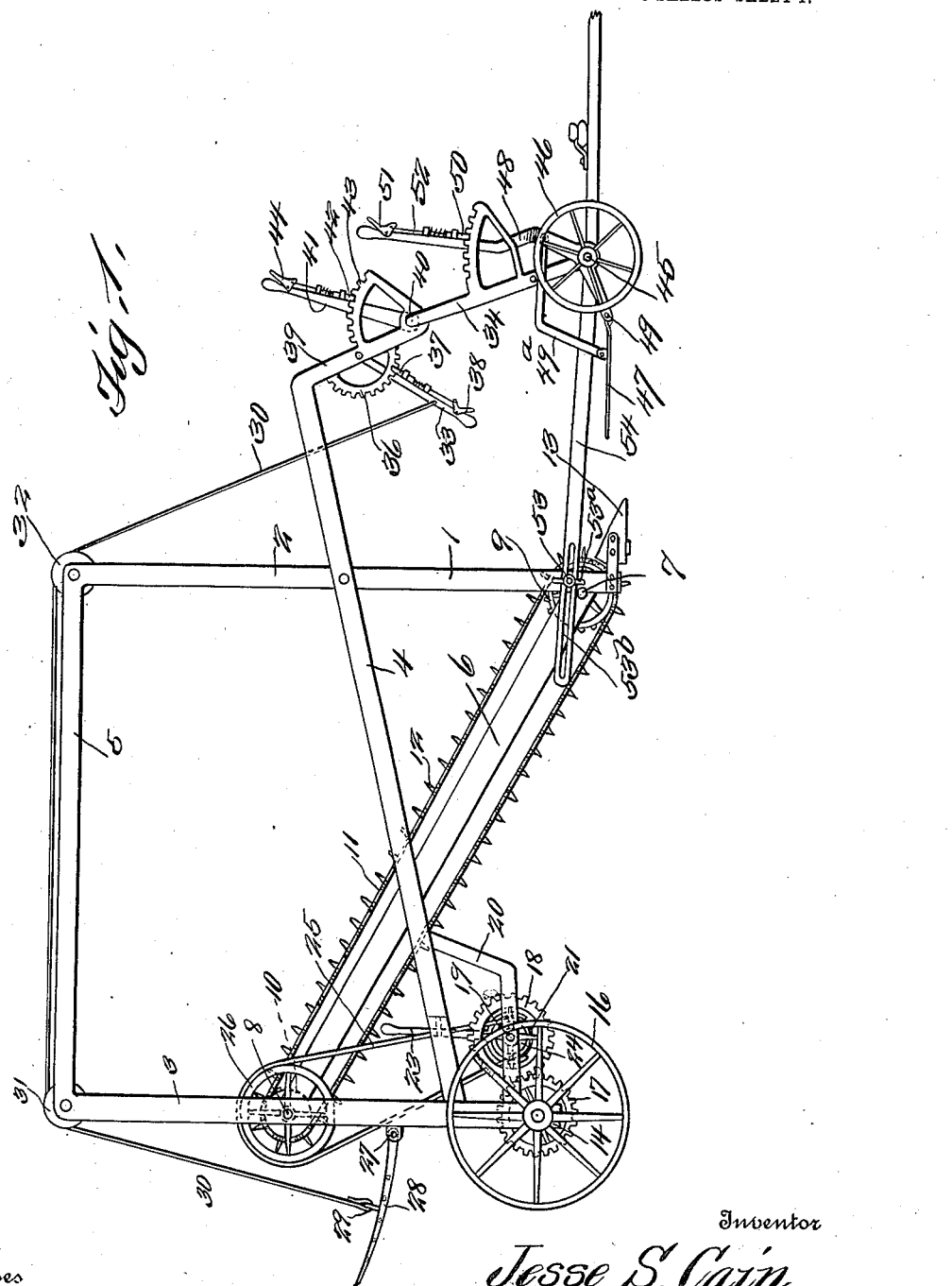

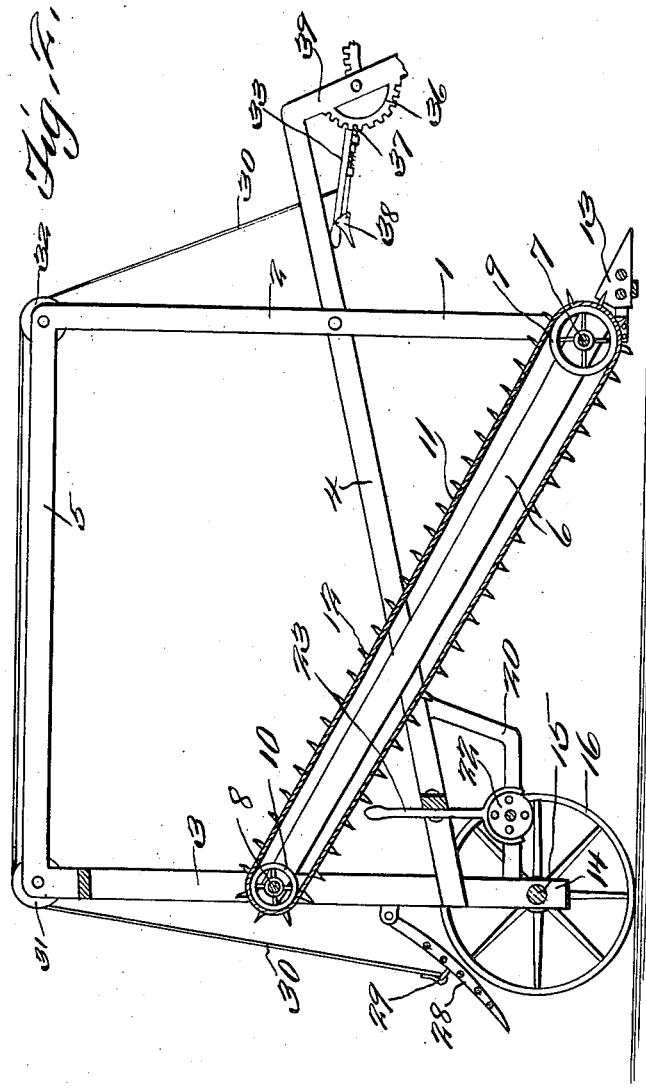

UNITED STATES PATENT OFFICE

JESSE S. CAIN, OF GRAND RAPIDS, MICHIGAN.

HARVESTER FOR BEANS AND THE LIKE.

1,093,108.     Specification of Letters Patent.     Patented Apr. 14, 1914.

Application filed August 10, 1911. Serial No. 643,353.

*To all whom it may concern:*

Be it known that I, JESSE S. CAIN, a citizen of the United States, residing at Grand Rapids, in the county of Kent and State of Michigan, have invented a new and useful Harvester for Beans and the like; and I do hereby declare the following to be a full, clear, and exact description of the invention, such as will enable others skilled in the art to which it appertains to make and use the same.

This invention relates to a new and useful harvesting machine, especially adapted for collecting beans, peas and other similar vegetables.

One of the features of the invention is to provide an inclined carrier, in the rear of which a pivoted fork is arranged to catch the beans, peas or the like as they fall from the upper end of the carrier.

A further feature of the invention is the provision of means for dumping the fork after being filled.

A further feature of the invention is the production of means for severing the beans, peas and the like, prior to being gathered by the fork in advance of the carrier.

A further feature of the harvester is the provision of means for raising and lowering the front end of the carrier.

The invention comprises further features and combination of parts as hereinafter set forth, shown in the drawings and claimed.

In the drawings:—Figure 1 is a view in side elevation of a harvester, embodying the invention. Fig. 2 is a sectional fragmentary view through the harvester, showing the fork in the rear and below the upper rear end of the conveyer or carrier adjusted in a different position from that shown in Fig. 1. Fig. 3 is a perspective view of the supplemental frame, which is in advance of the forward end of the carrier or conveyer frame. Fig. 4 is a detail view.

Referring to the drawings 1 designates the main frame, comprising the forward and rear beams 2 and 3, which are braced with relation to one another by the beams 4 and 5. Connecting the beams 1, 3 and 4 is the carrier or conveyer frame 6. Journaled in suitable bearings in the beams 1 and 3 are the shafts 7 and 8, on which are journaled the conveyer wheels 9 and 10, over which the conveyer 11 travels. The conveyer 11 is provided with suitable projections 12, for holding the beans, peas or the like on the conveyer as the same travels. Forward of the conveyer and secured to the beams 2 is the front fork 13, by which the beans, peas or the like are gathered, and then transferred to the carrier or conveyer.

Journaled in bearings 14 of the lower ends of the beams 3 is the shaft 15, on which the traction wheels 16 are mounted. Also journaled on the shaft 15 is a gear 17, which meshes with a similar gear 18 mounted on a shaft 19 of a supplemental frame 20. The gear 18 is provided with a clutch member 21, with which a correspondingly constructed clutch member 22 coöperates, there being a lever 23, for throwing the clutch member 22 in engagement with the clutch member 21, for throwing the conveyer or carrier in and out of gear. Journaled on the shaft 19 is a pulley 24 which rotates with the clutch member 21. The clutch member 21 is journaled loosely on the shaft 19. Traveling about the pulley 24 is a belt 25, which in turn travels about the pulley 26. The clutch member 22 is keyed to the shaft 19, and when the member 22 is thrown in clutch with the member 21 the pulley 24 rotates with the shaft 19. The pulley 26 is journaled to rotate with the shaft 8, so as to transmit power to the conveyer.

Pivoted at 27 to the rear beam 3 is a fork 28, which catches the beans, peas or the like subsequently to leaving the conveyer. Connected to the fork 28 as at 29 is a pull cord or rope 30, which passes over the pulleys 31 and 32, and over the upper portion of the frame of the machine. The forward end of the pull cord 30 connects to a lever 33, which is carried by the forward portions of the beams 4 which connect to the supplemental frame 34, which is arranged in advance of the fork 13. The lever 33 is designed for the purpose of lowering and raising the fork 28, there being a sector rack 36, a dog 37 and a hand grip 38, for holding the lever 33 in adjusted positions.

The supplemental frame 34 is provided with a suitable connection to the forward portion 39 of the main frame as at 40. The side bars of the supplemental frame 34 are connected by a rod 41$^a$, and movable with this rod 41$^a$ (which in turn forms an integral part of the side bars of the supplemental frame 34) are levers 41, having dogs 42 and hand grips 44. It will be apparent on reference to Figs. 1 and 3 of the drawings, that by manipulating the hand grips 44 the dogs 42 may be disengaged from the teeth of the racks 43 (which form an integral part of the forward portion 39 of the main frame) and when the dogs are disengaged the levers 41 may be moved backward and forward, and owing to the levers being movable with the supplemental frame 34, the supplemental frame 34 may be swung or oscillated, that is, the lower portion of the supplemental frame 34, using the rod 41$^a$ as a pivot, owing to the rod 41$^a$ being mounted in bearings of the forward end 39 of the main frame. When the lower portion of the supplemental frame is swung rearwardly, reference being had to Fig. 1, it will be seen that the forward end 39 of the main frame will rise slightly, and after having previously loosened the slot and bolt connections 53$^a$ and 53$^b$, it will be seen that the beams 1 owing to them being fixed to the beams 4 will rise slightly with the forward portion 39 of the main frame, and when the beams 1 are slightly raised, the fork 13 will rise with said beams 1, owing to the fork being fixed to the lower end of the beam 1. When the lower end or portion of the supplemental frame is thrown forwardly, by moving the lever 41 rearwardly, the forward portion 39 of the main frame including the bars 1 and the fork 13 will lower, that is, after having previously loosened the slot and bolt connections 53$^a$ and 53$^b$.

Journaled in bearings of the supplemental frame 34 is a shaft 45 on which the wheels 46 are journaled. This shaft 45 is provided with suitable knives, whereby the beans, peas or the like may be severed, prior to being gathered by the fork 13. Levers 48 having connections as at 49 with the rear ends of the knives 47, are provided, whereby the knives may be adjusted to various positions. The levers 48 are provided with suitable dogs 50, and hand grips 51 having connections 52 with the dogs, so as to hold the levers 48 in adjusted positions. Each lever 48 has a link 49$^a$ connected between it and each knife 47, in order to insure the adjustment of each knife. The lower ends of the beams 1 at their forward portions have connected to them as at 53, by means of slot and bolt connections 53$^a$ and 53$^b$ draft rods 54, which converge and terminate in a suitable tongue, whereby the apparatus may be drawn forward.

As the beans, peas or the like are severed by the knives 47 they are gathered by the fork 13, and conveyed rearwardly and upwardly by the conveyer 11, and subsequently dumped on the fork 28. When the fork 28 is sufficiently filled the same is lowered by throwing the lever 33, in the proper direction. By this method the beans, peas or the like may be dumped in piles at various locations throughout the field.

The invention having been set forth, what is claimed as new and useful is:—

In a harvester, a main frame, provided with forward extensions, the forward lower portion of the main frame being provided with a fork, a supplemental frame pivotally connected with the forward extensions, connections between the supplemental frame and the lower forward end of the main frame, the connections embodying bars having slot and bolt connections with the lower forward end of the main frame, means for swinging the forward portion of the supplemental frame whereby the fork may be raised or lowered, cutting mechanism arranged beneath the fork, and means for adjusting the cutting mechanism in a substantially horizontal plane.

In testimony whereof I have signed my name to this specification in the presence of two subscribing witnesses.

JESSE S. CAIN.

Witnesses:
FRED. D. SAYRE,
JAMES M. BUDD.